United States Patent
Nolte et al.

(10) Patent No.: US 12,209,886 B2
(45) Date of Patent: Jan. 28, 2025

(54) SYSTEM AND METHOD FOR MONITORING A FAILSAFE FUNCTION OF SENSORS IN A MOTOR

(71) Applicant: Siemens Aktiengesellschaft, Munich (DE)

(72) Inventors: Uwe Nolte, Barsinghausen (DE); Jan Spannberger, Neustadt am Rubenberge (DE)

(73) Assignee: Siemens Aktiengesellschaft, Munich (DE)

( * ) Notice: Subject to any disclaimer, the term of this patent is extended or adjusted under 35 U.S.C. 154(b) by 334 days.

(21) Appl. No.: 17/793,997

(22) PCT Filed: Dec. 8, 2020

(86) PCT No.: PCT/EP2020/085064
§ 371 (c)(1),
(2) Date: Jul. 20, 2022

(87) PCT Pub. No.: WO2021/148188
PCT Pub. Date: Jul. 29, 2021

(65) Prior Publication Data
US 2023/0042139 A1 Feb. 9, 2023

(30) Foreign Application Priority Data
Jan. 22, 2020 (EP) .................................. 20153160

(51) Int. Cl.
*G01D 5/14* (2006.01)
*H02K 11/215* (2016.01)
*H02K 29/08* (2006.01)

(52) U.S. Cl.
CPC ........... *G01D 5/145* (2013.01); *H02K 11/215* (2016.01); *H02K 29/08* (2013.01)

(58) Field of Classification Search
CPC ...... G01D 5/145; H02K 11/215; B62D 5/049; G05B 2219/14039; G05B 2219/42329; H04B 1/71055
See application file for complete search history.

(56) References Cited

U.S. PATENT DOCUMENTS 5,461,311 A * 10/1995 Nakazato ............... G01B 7/003
702/166
5,699,771 A * 12/1997 Tanabe .................. F02D 41/222
73/114.27
(Continued)

FOREIGN PATENT DOCUMENTS

| DE | 102006046286 | 6/2007 |
| DE | 102010053098 | 6/2012 |

(Continued)

OTHER PUBLICATIONS

PCT International Search Report dated Mar. 17, 2021 based on PCT/EP2020/085064 filed Dec. 8, 2020.
(Continued)

*Primary Examiner* — Bickey Dhakal
(74) *Attorney, Agent, or Firm* — Cozen O'Connor

(57) ABSTRACT

A system and method for redundantly monitoring faultless functioning of first and second rotational speed sensors on an electric motor, where the rotational speed is to precisely determine and monitor a rotor position, where a first product is formed from a first current count of the first output signal of the first sensor and a maximum count of the second output signal, a second product is formed from a second current count of the second output signal of the second sensor and a maximum count of the first output signal, the two products are cyclically checked for equality and, in when the check is negative, an error message is generated, where the method provides the position of both sensors in a common values system and the positions can be directly compared with one (Continued)

another such that precise determination and monitoring of the rotor position becomes possible.

14 Claims, 2 Drawing Sheets

(56) References Cited

U.S. PATENT DOCUMENTS

| | | | |
|---|---|---|---|
| 10,036,654 B1* | 7/2018 | Long | G01D 5/145 |
| 2003/0033033 A1* | 2/2003 | Lin | G01D 5/24476 |
| | | | 700/59 |
| 2009/0072986 A1 | 3/2009 | Bussert et al. | |
| 2014/0219413 A1* | 8/2014 | Wallner | G01D 5/24461 |
| | | | 377/112 |
| 2016/0161304 A1* | 6/2016 | Son | G01D 3/08 |
| | | | 324/207.12 |
| 2018/0180454 A1* | 6/2018 | Lechner | H02P 6/34 |
| 2023/0213356 A1* | 7/2023 | Watanabe | B62D 5/049 |
| | | | 324/207.25 |

FOREIGN PATENT DOCUMENTS

| | | | | |
|---|---|---|---|---|
| EP | 0742505 | 11/1996 | | |
| EP | 4067826 A1 * | 10/2022 | | B60W 20/40 |

OTHER PUBLICATIONS

EP Search Report dated Aug. 6, 2020 based on EP20153160 filed Jan. 22, 2020.
"Systemhandbuch Automatische Tursteuerung, SIDOOR ATE530S COATed/ATE531S COATED/ATE531S, Ausgabe Nov. 2019", pp. 1-245 (System Handbook Automatic Door Control, Issue Nov. 2019).

* cited by examiner

SYSTEM AND METHOD FOR MONITORING A FAILSAFE FUNCTION OF SENSORS IN A MOTOR

CROSS-REFERENCE TO RELATED APPLICATIONS

This is a U.S. national stage of application No. PCT/EP2020/085064 filed 8 Dec. 2020. Priority is claimed on European Application No. 20153160.5 filed 22 Jan. 2020, the content of which is incorporated herein by reference in its entirety.

BACKGROUND OF THE INVENTION

1. Field of the Invention

The invention relates to a method for monitoring failsafe operation of at least one first and one second sensor, which operate independently of each other, where the two sensors are operated for ascertaining a rotational speed of an electric motor, where the rotational speed is in turn used for failsafe rotor position determination in the case of the electric motor, and where the first sensor supplies a first output signal and the second sensor supplies a second output signal.

The invention also relates to a servo drive system comprising an electric motor, a first sensor, a second sensor, an automation controller with a user program, where the user program is configured to perform the monitoring of failsafe operation of the first sensor and the second sensor, where the two sensors are configured for ascertaining a rotational speed of the electric motor, where the rotational speed is in turn used for failsafe rotor position determination, and where the first sensor supplies a first output signal and the second sensor supplies a second output signal.

2. Description of the Related Art

Motion control task requirements in automation engineering are continuously increasing and are becoming ever more diverse and complex. The company Siemens AG currently has a servo drive system "SIMATIC Micro-Drive" on the market, which provides a perfect introduction to digitization. In particular in view of safety-related applications, such as the rotational speed, the motor current, a torque of a motor used, must be monitored. Safety functions, such as STO, SS1, SLT, SLS, SSM, have to be met. These safety functions are cited in International Electrotechnical Commission (IEC) standard 61508 and IEC standard 13849. SIL2 and Cat.2 levels will also be referred to, moreover.

Rotational speed monitoring forms the starting point for limiting a torque or reliably determining a rotor position. With this kind of monitoring the rotational speed is monitored by way of a reciprocal comparison of two sensors. In the case of a conventional device "Systemhandbuch Automatische Türsteuerung, SIDOOR ATE530S COATed/ATE531S COATED/ATE531S, Ausgabe November 2019" [System Handbook Automatic Door Control, Issue November 2019], the following monitoring is used for determination of the safe rotor position: a comparison of a real rotational speed with a rotational speed calculated via a basic wave model of the respective motor is made. In addition, a regular exchange of synchronization telegrams with the angular momentum sensor is made. An algorithm ensures that the rotational speed, aside from the function, of a sensor is monitored via a mathematical model of the motor. Angular and rotational speed faults may be detected therewith.

In the conventional monitoring methods, it is problematic that two sensors typically work in different reference systems and thus cannot be easily compared with each other. For example, an incremental encoder frequently has a 100 strokes per rotation, and with fourfold scanning this results in 400 flanks per rotation, whereas a Hall sensor has, for example, 6 segments per electrical rotation. A motor with two pairs of poles would thereby have 2×6 segments and thus also 12 segment changes per mechanical rotation.

EP 0 742 505 A2 discloses an apparatus for the safety-focused monitoring of an axis of a machine, where two incremental encoder systems determine a rotor position and these variables are compared with one another in order to establish a fault.

DE 10 2010 053 098 A1 discloses a method for monitoring a rotor position sensor with two sensors, i.e., a motor current sensor and a rotational speed sensor, where it is possible to infer a fault via the variables measured therewith.

DE 10 2006 046 286 A1 discloses a method for monitoring the movement of a motor, where the movement of the motor is reliably monitored via two redundant rotational speed sensors.

SUMMARY OF THE INVENTION

It is the object of the present invention to provide a method, which has a lower level of complexity in comparison to the conventional method and is also relatively fast, in other words it must be easy to implement in a program.

This and other objects and advantages are achieved in accordance with the invention by a method for monitoring failsafe operation of at least one first and one second sensor, which operate independently of each other, where the two sensors are operated for ascertaining a rotational speed of an electric motor, wherein the rotational speed is in turn used for failsafe rotor position determination in the case of the electric motor, where the first sensor supplies a first output signal and the second sensor supplies a second output signal, and where a first product of a first current count value of the first output signal and a maximum count value of the second output signal and a second product of a second current count value of the second output signal and a maximum count value of the first output signal is formed and the two products are cyclically checked for equality, and for the case where the check is negative, a fault indication is generated.

The invention starts from transforming input information of, as a rule, two different sensors (diverse) into an abstracted and identical value system for the two sensors or signals. If, there is, for example, firstly for the first sensor, an incremental encoder, and secondly for the second sensor, a Hall sensor, an instantaneous value of the first sensor can be multiplied by a numerical range of the second sensor and an instantaneous value of the second sensor can be multiplied by a numerical range of the first sensor, then a position of the two sensors in a shared value system is obtained and these can be directly compared with each other.

Preferably, the maximum count values are ascertained with an initialization run during an initial operation. This means the motor is actuated such that it executes exactly one rotation and, in an associated computing unit, the rotary pulses or segment changes for an entire rotation are counted.

Furthermore, it is advantageous if after triggering a fault indication, a further check is made to determine whether, over an adjustable period with an incremental encoder as the first sensor, counting pulses or with a Hall sensor as the second sensor, segment changes fail to materialize and for the case where the check is positive, an indication for a sensor cable failure or a sensor failure is generated.

In order to detect sporadic faults in particular, the first product and the second product are each added up continuously in a first or second endless counter and the first endless counter is periodically checked for equality with the second endless counter and for the case where an inequality is found, a fault indication of a sporadic malfunction is output. The following advantages are produced with this implementation.

For a simple implementation, individual Hall sectors do not have to be exactly detected, a change of direction and retention of a direction no longer play a part, complete failures of individual lines or sensors are recognized immediately, intermittent interruptions or short-circuits become noticeable via differences in the endless counters and are recognized when the limit values are exceeded, and individual missing strokes or Hall sectors distort the endless counters and are recognized when the limit values are exceeded. That practically all faults become noticeable in an infringement of the rigid coupling of the sensors and the endless sums are also distorted thereby is regarded as a fundamental advantage of the endless counting. The consideration of endless counters or the endless sum is thus an ideal method for recognizing faults.

For a derivation of the shared value system, in accordance with the inventive method, the first output signal is standardized to a shared value system, whereby a first standard value is provided and likewise the second output signal of the second sensor is standardized to the shared value system, whereby a second standard value is provided, where the standard values are cyclically formed via a first quotient of the first current count value of the first output signal and the first maximum count value of the first output signal and a second quotient of the second current count value of the second output signal and the second maximum count value of the second output signal.

Preferably, the above-mentioned method steps are performed in a user program of an automation controller.

Furthermore, during the method the electric motor is supplied with energy by an inverter and the inverter is in turn controlled by the automation controller. A safe rotor position is a necessary basis for determination of a given motor moment and therewith for a safe force output. Faultless rotor position determination is necessary in order to guarantee this safety.

The above-mentioned method steps describe an exact determination and monitoring of the rotor position.

It is also an object of the invention to provide a servo drive system comprising an electric motor, a first sensor, a second sensor, an automation controller with a user program, where the user program is configured to carry out the monitoring of failsafe operation of the first sensor and the second sensor, wherein the two sensors are configured for ascertaining a rotational speed of the electric motor, wherein the rotational speed is in turn used for failsafe rotor position determination in the case of the electric motor, wherein the first sensor supplies a first output signal and the second sensor supplies a second output signal, in that the user program is configured to perform the method in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings show one exemplary embodiment of the invention, in which.

DETAILED DESCRIPTION OF THE EXEMPLARY EMBODIMENTS

Figure 1:
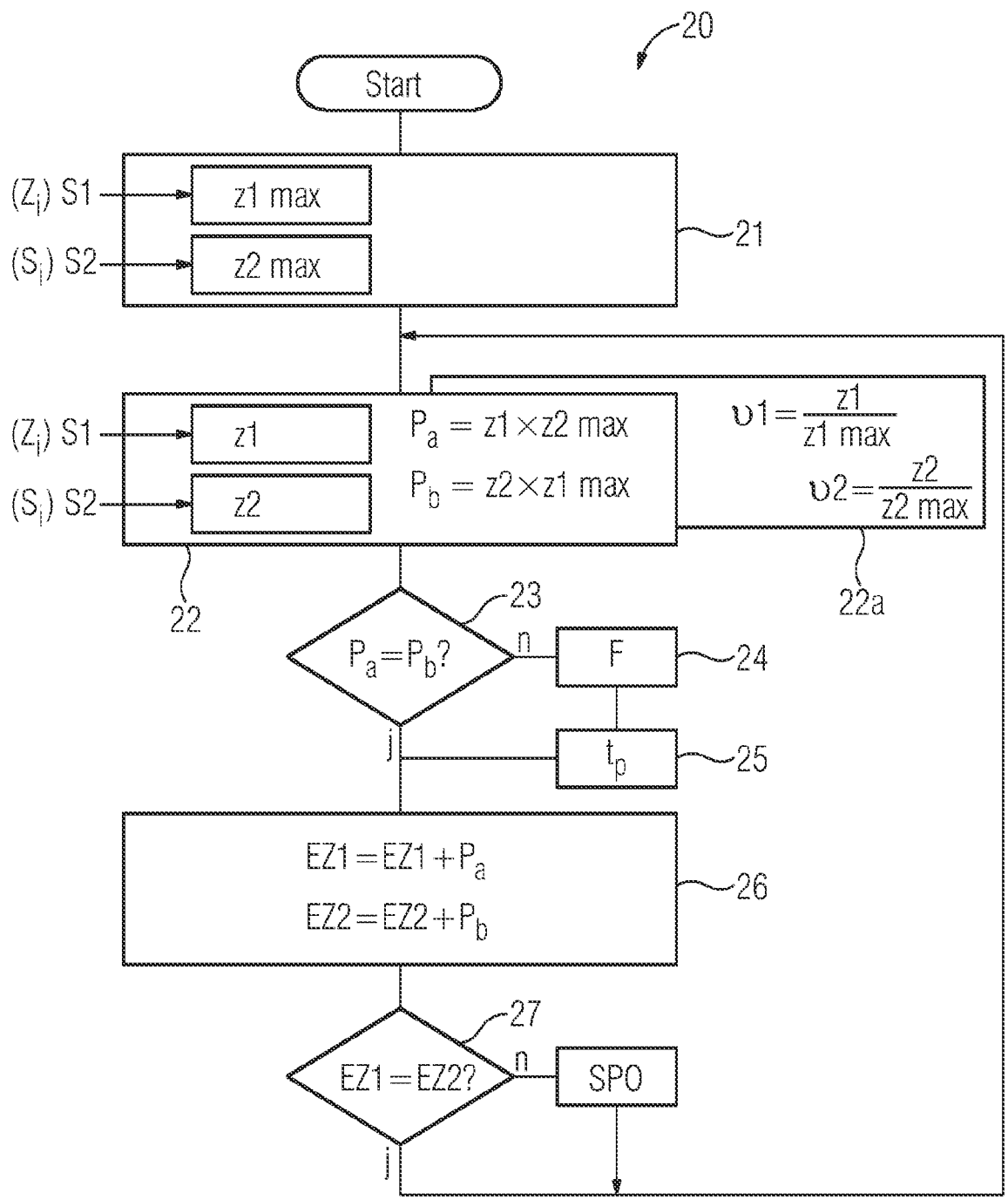
FIG. 1 shows a program flowchart of the method in accordance with the invention.

With reference to FIG. 1, a program flowchart 20 for the inventive method is illustrated. Commencing from a program start, in an initialization phase 21, the counting pulses $Z_i$ are read from the first sensor S1 and the segment changes $S_i$ are read from the second sensor S2. In the initialization phase 21, the motor M is actuated by programming such that the motor M executes exactly one rotation. As a result, the maximum counting pulses for a first maximum count value Z1max of the first sensor S1 and for a second maximum count value Z2max of the second sensor S2 are ascertained.

In a further method step, i.e., the counter value reading-in 22, the counting pulses $Z_i$ or the segment changes $S_i$ of the first counter Z1 or the second sensor S2 are cyclically read-in and a first product $P_a$ of a first current count value Z1 of the first output signal A1 and a maximum count value Z2max of the second output signal A2 is formed and furthermore, a second product $P_b$ of a second current count value Z2 of the second output signal A2 and a maximum count value Z1max of the first output signal A1 is formed. In the program segment: equality check 23 the first product $P_a$ is cyclically checked for equality with the second product $P_b$ and for the case where the check is negative, a fault indication F is generated in the output fault indication 24 segment.

In an additional segment: start of monitoring time 25, after triggering of the fault indication F a further check is made to determine whether, over an adjustable period $t_p$ with an incremental encoder as the first sensor S1, counting pulses $Z_i$ or with a Hall sensor as the second sensor S2, segment changes $S_i$ fail to materialize and, for the case where the check is positive, an indication SLA for a sensor cable failure or a sensor failure is generated.

In a program segment: adding up 26, a first endless counter EZ1 is formed by cyclically adding up the first product $P_a$ and a second endless counter EZ2 is formed by cyclically adding up the second product PD. In a further equality check 27, the first endless counter EZ1 is then periodically checked for equality with the second endless counter EZ2, and for the case where an inequality is found, a fault indication of a sporadic malfunction SPO is output.

In order to derive the shared value system, in a standardization step 22a a first standard value y1 is formed in that a first quotient of the first current count value Z1 of the first output signal A1 and the first maximum count value Z1max of the first output signal A1 and a second standard value y1 is formed in that a second quotient of the second current count value Z2 of the second output signal A2 and a second maximum count value Z2max of the second output signal A2 is formed.

Figure 2:
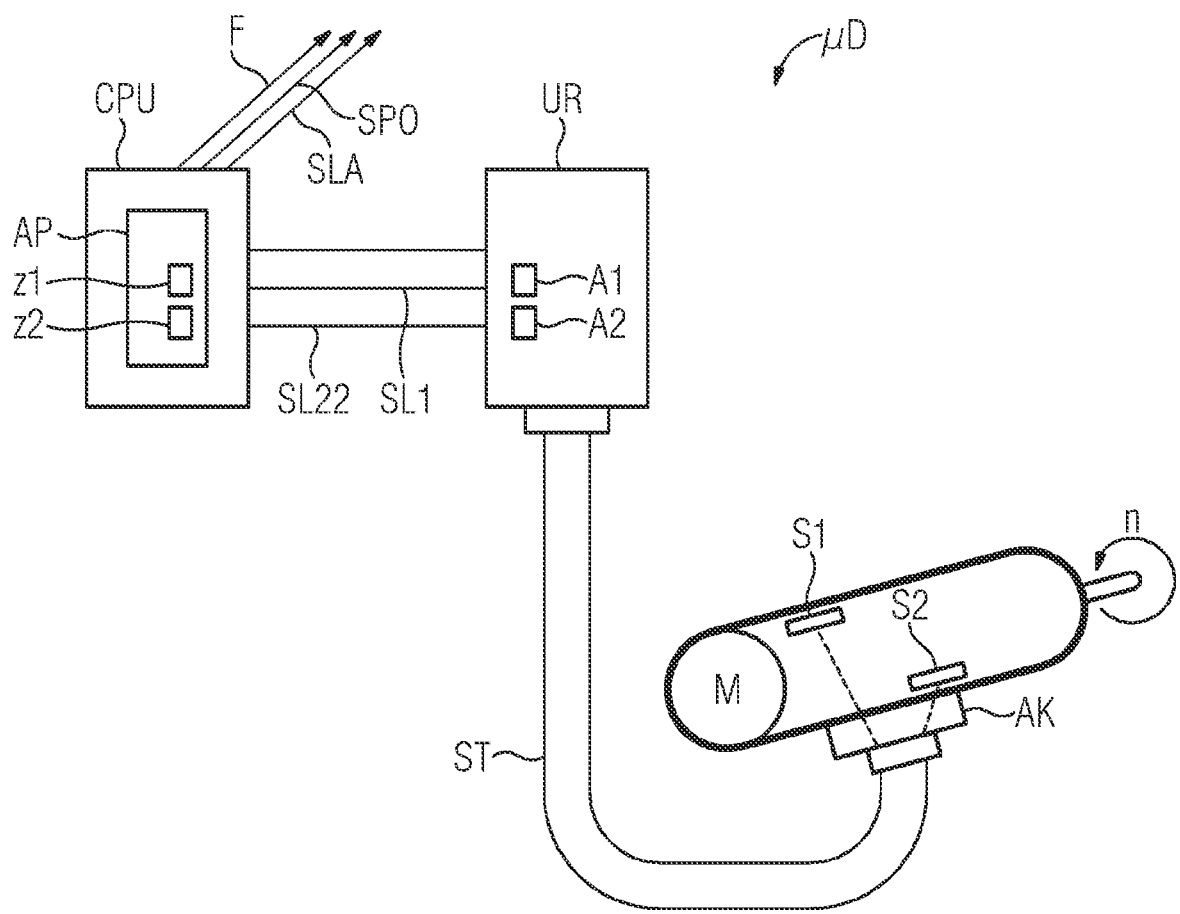
FIG. 2 shows a schematic illustration of a servo drive system in accordance with the invention.

With reference to FIG. 2, a servo drive system μD is illustrated. The servo drive system μD comprises an electric motor M, a first sensor S1, a second sensor S2, an automation controller CPU with a user program AP. The user program AP is configured to monitor failsafe operation of the first sensor S1 and the second sensor S2, with the two sensors S1, S2 being configured to ascertain a rotational speed n of the electric motor M, with the rotational speed n in turn being used for failsafe rotor position determination in the case of the electric motor M.

The first sensor S1 supplies a first output signal A1 and the second sensor S2 supplies a second output signal A2. The first sensor S1 and the second sensor S2 are integrated in the motor M. A plug-in cable ST is plugged in via a terminal box AK and establishes the connection between an inverter UR and the electric motor M. The inverter UR is coupled via communication cables to the automation controller CPU. The counting pulses $Z_i$ of the first sensor S1 are conducted to the automation controller CPU via a first sensor cable SL1 and the segment changes $S_i$ are conducted from the inverter UR to the automation controller CPU via a second sensor cable SL2.

The automation controller CPU has a user program AP in which the first current count value Z1 and the second current count value Z2 are evaluated in accordance with the method. If faults should occur during the counter evaluation then, with the aid of the user program AP, the automation controller CPU generates a fault indication F or an indication of failure of the sensor cable SLA or a fault indication of a sporadic malfunction SPO.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for monitoring failsafe operation of at least one first and one second sensor of a servo drive system including an electric motor, the at least one first sensor, the second sensor and an automation controller, the at least one first and second sensors operating independently of each other, the at least one first and second sensors being operated to ascertain a rotational speed of the electric motor, the rotational speed being subsequently utilized for failsafe rotor position determination of the electric motor, and the at least one first sensor supplying a first output signal and the second sensor suppling a second output signal, the method comprising:

operating the servo drive system and monitoring, by the automation controller, the failsafe operation of the at least one first sensor and the second sensor;

forming a first product of a first current count value of the first output signal and a maximum count value of the second output signal obtained by the at least one first sensor during operation of the servo drive system;

forming a second product of a second current count value of the second output signal and a maximum count value of the first output signal obtained by the second sensor during operation of the servo drive system;

checking cyclically, by the automation controller, the first and second products for equality while monitoring failsafe operation of the at least one first sensor and the second sensor;

generating a fault indication when the check is negative while operating the servo drive system and monitoring the failsafe operation of the at least one first sensor and the second sensor; and applying at least one safety function to the electric motor based on receipt of the fault indication, the safety function comprising at least one of STO, SS1, SLT, SLS and SSM.

2. The method as claimed in claim 1, wherein the maximum count values are ascertained with an initialization run during an initial operation of the servo drive system.

3. The method as claimed in claim 2, wherein after triggering of the fault indication, the method further comprising:

performing a check to determine whether, over an adjustable period with an incremental encoder as the first sensor, counting pulses or with a Hall sensor as the second sensor, segment changes fail to materialize; and generating an indication for a sensor cable failure or a sensor failure when the check is positive.

4. The method as claimed in claim 3, wherein the first output signal is standardized to a shared value system to provide a first standard value and the second output signal of the second sensor is standardized to the shared value system to provide a second standard value; and wherein the first and second standard values are cyclically formed via (i) a first quotient of the first current count value of the first output signal and the first maximum count value of the first output signal and (ii) a second quotient of the second current count value of the second output signal and the second maximum count value of the second output signal.

5. The method as claimed in claim 2, wherein the first product and the second product are each added up continuously in a first or second endless counter and the first endless counter is periodically checked for equality with the second endless counter and, when an inequality is found, a fault indication of a sporadic malfunction is output.

6. The method as claimed in claim 2, wherein the first output signal is standardized to a shared value system to provide a first standard value and the second output signal of the second sensor is standardized to the shared value system to provide a second standard value; and wherein the first and second standard values are cyclically formed via (i) a first quotient of the first current count value of the first output signal and the first maximum count value of the first output signal and (ii) a second quotient of the second current count value of the second output signal and the second maximum count value of the second output signal.

7. The method as claimed in claim 1, wherein after triggering of the fault indication, the method further comprising:
performing a check to determine whether, over an adjustable period with an incremental encoder as the first sensor, counting pulses or with a Hall sensor as the second sensor, segment changes fail to materialize; and
generating an indication for a sensor cable failure or a sensor failure when the check is positive.

8. The method as claimed in claim 7, wherein the first product and the second product are each added up continuously in a first or second endless counter and the first endless counter is periodically checked for equality with the second endless counter and, when an inequality is found, a fault indication of a sporadic malfunction is output.

9. The method as claimed in claim 7, wherein the first output signal is standardized to a shared value system to provide a first standard value and the second output signal of the second sensor is standardized to the shared value system to provide a second standard value; and
wherein the first and second standard values are cyclically formed via (i) a first quotient of the first current count value of the first output signal and the first maximum count value of the first output signal and (ii) a second quotient of the second current count value of the second output signal and the second maximum count value of the second output signal.

10. The method as claimed in claim 1, wherein the first product and the second product are each added up continuously in a first or second endless counter and the first endless counter is periodically checked for equality with the second endless counter and, when an inequality is found, a fault indication of a sporadic malfunction is output.

11. The method as claimed in claim 1, wherein the first output signal is standardized to a shared value system to provide a first standard value and the second output signal of the second sensor is standardized to the shared value system to provide a second standard value; and
wherein the first and second standard values are cyclically formed via (i) a first quotient of the first current count value of the first output signal and the first maximum count value of the first output signal and (ii) a second quotient of the second current count value of the second output signal and the second maximum count value of the second output signal.

12. The method as claimed in claim 1, wherein the method is executed in a user program of an automation controller.

13. The method as claimed in claim 12, wherein an inverter supplies the electric motor with energy and the inverter is in turn controlled by the automation controller.

14. A servo drive system comprising:
an electric motor;
a first sensor;
a second sensor;
an automation controller including a user program which, when executed by the automation controller, performs monitoring of failsafe operation of the first and second sensors;
wherein the first and second sensors are configured to ascertain a rotational speed of the electric motor, the rotational speed being subsequently utilized for failsafe rotor position determination of the electric motor;
wherein the first sensor supplies a first output signal and the second sensor supplies a second output signal;
wherein the user program is configured to:
form a first product of a first current count value of the first output signal and a maximum count value of the second output signal;
form a second product of a second current count value of the second output signal and a maximum count value of the first output signal;
cyclically check the first and second products for equality;
generate a fault indication when the check is negative; and
apply at least one safety function to the electric motor based on the fault indication, the safety function comprising at least one of STO, SS1, SLT, SLS and SSM;
wherein the monitoring of the failsafe operation of the first and second sensors are performed by the automation controller during operation of the servo drive system.

* * * * *